United States Patent
Gaumnitz et al.

(10) Patent No.: US 11,386,104 B2
(45) Date of Patent: *Jul. 12, 2022

(54) COMPRESSING TIME STAMP COLUMNS

(71) Applicant: SAP SE, Walldorf (DE)

(72) Inventors: Gordon Gaumnitz, Walldorf (DE); Lars Dannecker, Dresden (DE); Robert Schulze, Walldorf (DE); Ivan T. Bowman, Kitchener (CA); Daniel James Farrar, Kitchener (CA)

(73) Assignee: SAP SE, Walldorf (DE)

( * ) Notice: Subject to any disclaimer, the term of this patent is extended or adjusted under 35 U.S.C. 154(b) by 155 days.

This patent is subject to a terminal disclaimer.

(21) Appl. No.: 16/661,993

(22) Filed: Oct. 23, 2019

(65) Prior Publication Data
US 2020/0057763 A1    Feb. 20, 2020

Related U.S. Application Data

(63) Continuation of application No. 14/326,352, filed on Jul. 8, 2014, now Pat. No. 10,496,656.

(51) Int. Cl.
*G06F 16/2458* (2019.01)
*G06F 16/22* (2019.01)

(52) U.S. Cl.
CPC ...... *G06F 16/2477* (2019.01); *G06F 16/2237* (2019.01)

(58) Field of Classification Search
CPC .................. G06F 16/2477; G06F 16/2237
See application file for complete search history.

(56) References Cited

U.S. PATENT DOCUMENTS

| | | | |
|---|---|---|---|
| 4,585,004 A | 4/1986 | Brownlee |
| 5,111,816 A | 5/1992 | Pless |
| 6,772,004 B2 | 8/2004 | Rudy |
| 7,801,898 B1 | 9/2010 | Weissman |
| 8,452,755 B1 | 5/2013 | Ye |
| 9,197,710 B1 | 11/2015 | Matthews |
| 2002/0087685 A1 | 7/2002 | Lassen |
| 2002/0128565 A1 | 9/2002 | Rudy |
| 2006/0004715 A1 | 1/2006 | Lock |
| 2008/0109041 A1 | 5/2008 | De Voir |
| 2011/0218978 A1 | 9/2011 | Hong |
| 2013/0103657 A1 | 4/2013 | Ikawa |

(Continued)

OTHER PUBLICATIONS

Keogh, et al., Segmenting time series: A survey and novel approach, Data Mining in Time Series Databases, 1993, pp. 1-21.

(Continued)

*Primary Examiner* — Hau H Hoang
(74) *Attorney, Agent, or Firm* — Mintz Levin Cohn Ferris Glovsky and Popeo, P.C.

(57) ABSTRACT

Disclosed is a system and method for improving database memory consumption and performance using compression of time stamp columns. A number of time stamps of a time series is received. The time stamps have a start time, and are separated by an equal increment of time that defines an interval. The start time and interval are stored in a dictionary of a column store of a database. An index is generated in the column store of the database, the index having a number of index vectors. Using the index vectors, each time stamp of the number of time stamps can be calculated from the start time stored in the dictionary and the position in the time series based on the interval stored in the dictionary.

12 Claims, 5 Drawing Sheets

(56) References Cited

U.S. PATENT DOCUMENTS

| | | |
|---|---|---|
| 2013/0166566 A1 | 6/2013 | Lemke |
| 2013/0262411 A1 | 10/2013 | Kadatch |
| 2014/0040276 A1 | 2/2014 | Chen |
| 2015/0089075 A1 | 3/2015 | Strigeus |
| 2015/0199413 A1 | 7/2015 | Brown |
| 2015/0213072 A1 | 7/2015 | Chen et al. |
| 2015/0317212 A1 | 11/2015 | Lee et al. |
| 2016/0012085 A1 | 1/2016 | Gaumnitz |
| 2016/0012094 A1 | 1/2016 | Gaumnitz |
| 2016/0331471 A1 | 11/2016 | Deno |

OTHER PUBLICATIONS

Komarov, et al., Identifying gaps in time-series data, MathWorks, Jul. 2011.

COMPRESSING TIME STAMP COLUMNS

CROSS REFERENCE TO RELATED APPLICATION

The present application claims priority to U.S. patent application Ser. No. 14/326,352, filed Jul. 8, 2014, entitled COMPRESSING TIME STAMP COLUMNS, the disclosure of which is incorporated herein by reference in its entirety.

TECHNICAL FIELD

The subject matter described herein relates to data platforms, and more particularly to a system and method for compressing series data of a database.

BACKGROUND

FIG. 1 is a block diagram of a data processing system 100. The data processing system 100 includes a data platform 102 that receives and/or transmits data to one or more external data sources 103. The data platform 102 can be, without limitation, a web server including one or more server computers and one or more processors. The external data sources 103 can be, without limitation, client computers including one or more processors, but can also include server computers, mobile computing devices, desktop or laptop computers, and the like.

The data platform 102 includes a storage layer 104 for storing data received from the one or more external data sources 103. The storage layer 104 can include a database, such as an in-memory database or hard-disk drive database. Consistent with implementations described herein, the storage layer 104 further includes a column store 106, and may also include a row store 108. Series data 110, such as time stamps or other serial or regular interval-based data, is preferably stored on column store 106.

When dealing with series data in a storage layer of a data platform, improving memory consumption and general performance in a manner that is virtually transparent to the user, and involves an ease of use when handling this kind of data using an extensive number of time series analysis functionality, is very challenging.

SUMMARY

This document describes various storage extensions, which are specifically adapted to the characteristics and requirements of time series data. The extensions comprise special compression formats for time stamps. In particular, this document describes systems and methods for compressing series data such as time stamps.

In one aspect, a process for improving database memory consumption and performance includes using compression of time stamp columns. A method for compressing time stamp columns includes receiving a number of time stamps of a time series for operations executed on a database of a data platform. The number of time stamps has a start time, and each successive pair of time stamps of the number of time stamps are separated by an equal increment of time that defines an interval, each interval defining a position in the time series for each time stamp of the number of time stamps. The method further includes storing, by one or more processors of the data platform, the start time and interval in a dictionary of a column store of the database, and generating, by the one or more processors, an index in the column store of the database, the index having a plurality of index vectors. The method further includes calculating, by the one or more processors using the plurality of index vectors, the time stamp of the plurality of time stamps from the start time stored in the dictionary and the position in the time series based on the interval stored in the dictionary.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide compression of time stamp columns to improve memory consumption and general performance of a database.

Figure 1:
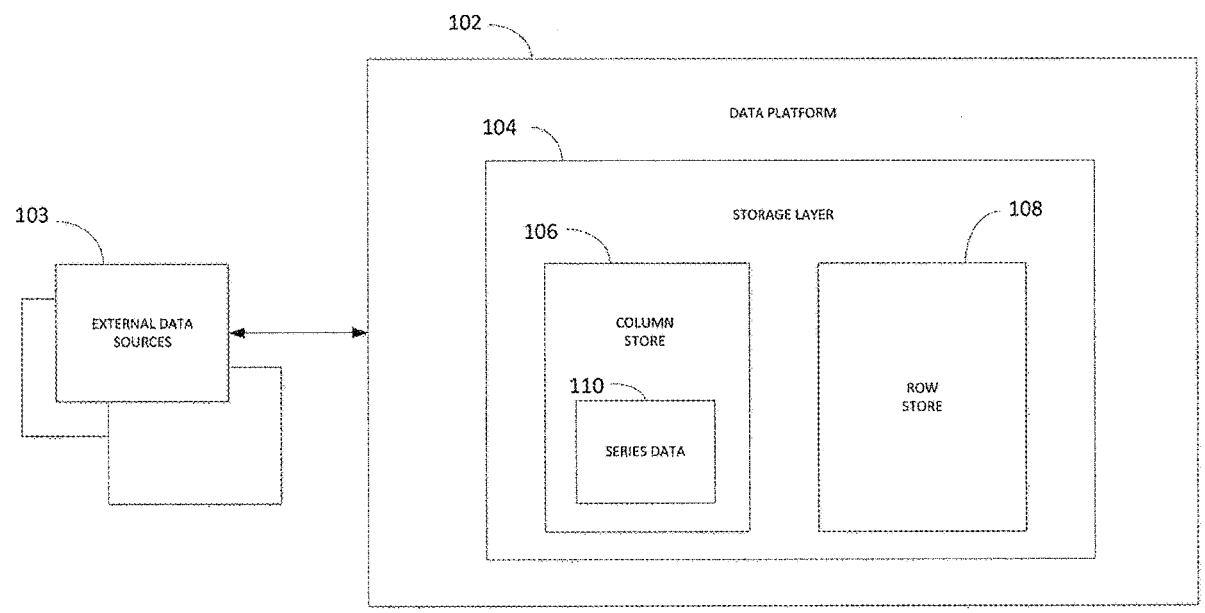
FIG. 1 is a diagram illustrating aspects of a database system showing features consistent with implementations of the current subject matter.
Figure 2:
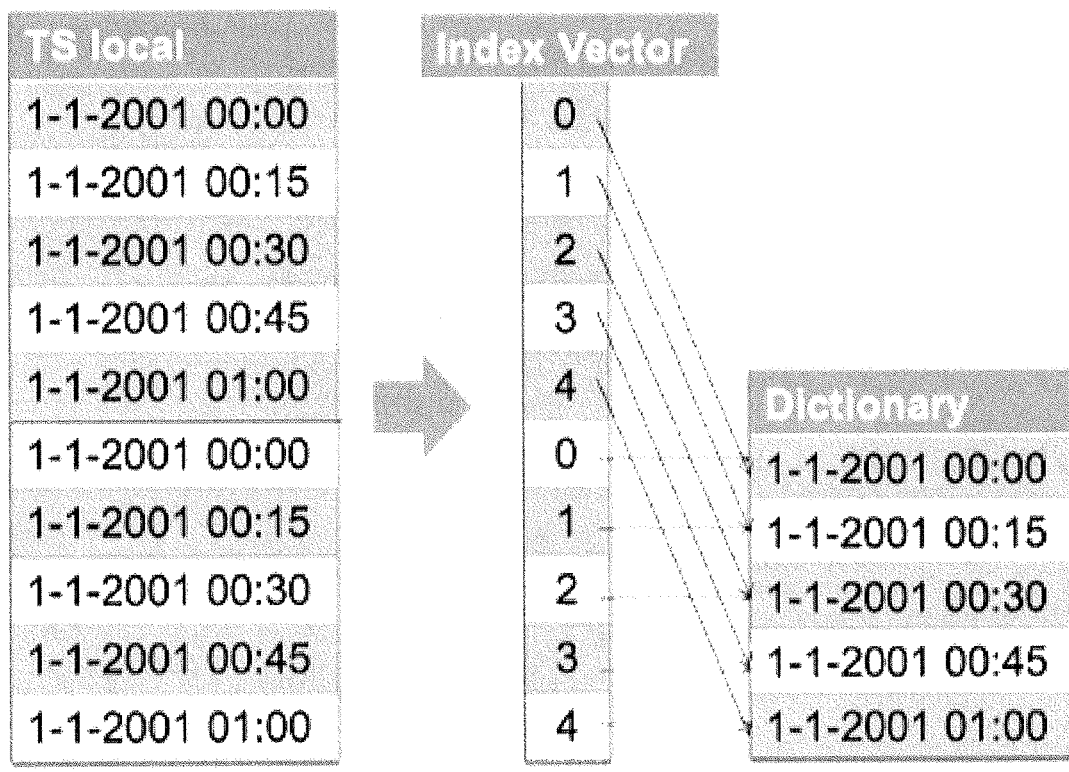
FIG. 2 shows a conventional time stamp dictionary approach.

The database system stores time stamps, typically using standard dictionary encoding. This means that all time stamps considered in the column are stored within a dictionary and that the actual values in the column are replaced by integer references ("value-ids") pointing into the dictionary. When reading dictionary encoded time stamps, the respective value-ids are read in the index-vector, and the respective position is searched for in the dictionary. This is illustrated in FIG. 2. Since all time stamps available in the table are stored in the dictionary, the memory consumption increases linearly with the number of distinct time stamps.

However, memory consumption of equidistant time series can be optimized, since one of their major characteristics is a consistently progressing (increasing or decreasing) time. In particular, adjacent time stamps exhibit equal deltas between them. Thus, using the starting time $T_s$ and the respective time interval I, the timestamp for every entry in the time series at its position i can be calculated.

Figure 3:
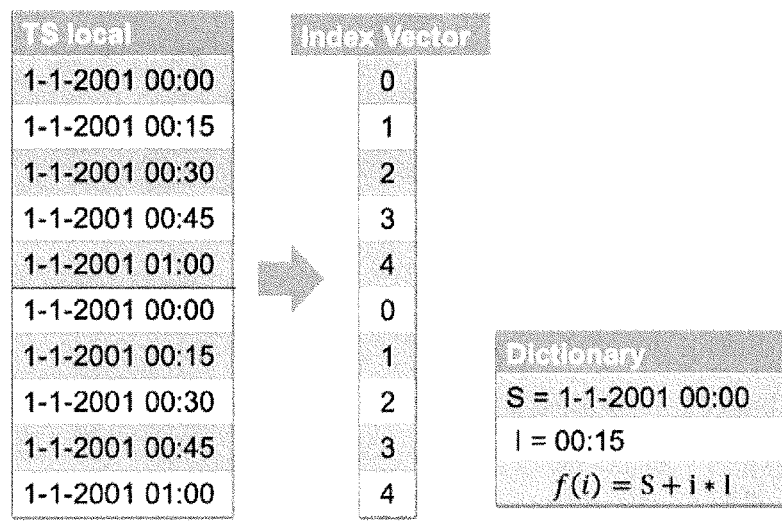
FIG. 3 shows an enhanced time stamp dictionary with constant memory consumption.

Accordingly, in an optimized time series dictionary, only the starting time and the time interval of the time series is stored, instead of storing the actual time stamps. Furthermore, the index vector for an equidistant time series exactly represents the entry positions within the time series, resulting in a likewise constantly increasing or decreasing sequence of index values. This approach is illustrated in FIG. 3. When reading values from the series table, the time stamps can be determined as:

$$T_i = i*I + T_s$$

With this optimization, the dictionary is constant in size, instead of increasing linearly with the number of time stamps.

One major requirement of the time series dictionary is that it needs to contain a complete, gapless, consecutive sequence of time stamps. A missing time stamp is not supported and will break the dictionary, since in this case the index value no longer complies with the positions of the time stamps in a time series. As a result, while the dictionary supports missing values in a subset of time series contained in a table, it does not support gaps in the timestamps. In this regard, a gap in the time stamps of a (multi-variate) time series means that all sub time series considered in a table do not exhibit a value for a specific time stamp given by the natural time stamp sequence. Thus, a gap breaks the requirement of the current dictionary approach that it needs to contain all distinct time stamps form a gapless, consecutive, ordered sequence. Since some use-cases also need support for gaps in time series, the dictionary compression can be further enhanced to support this special case.

Figure 4:
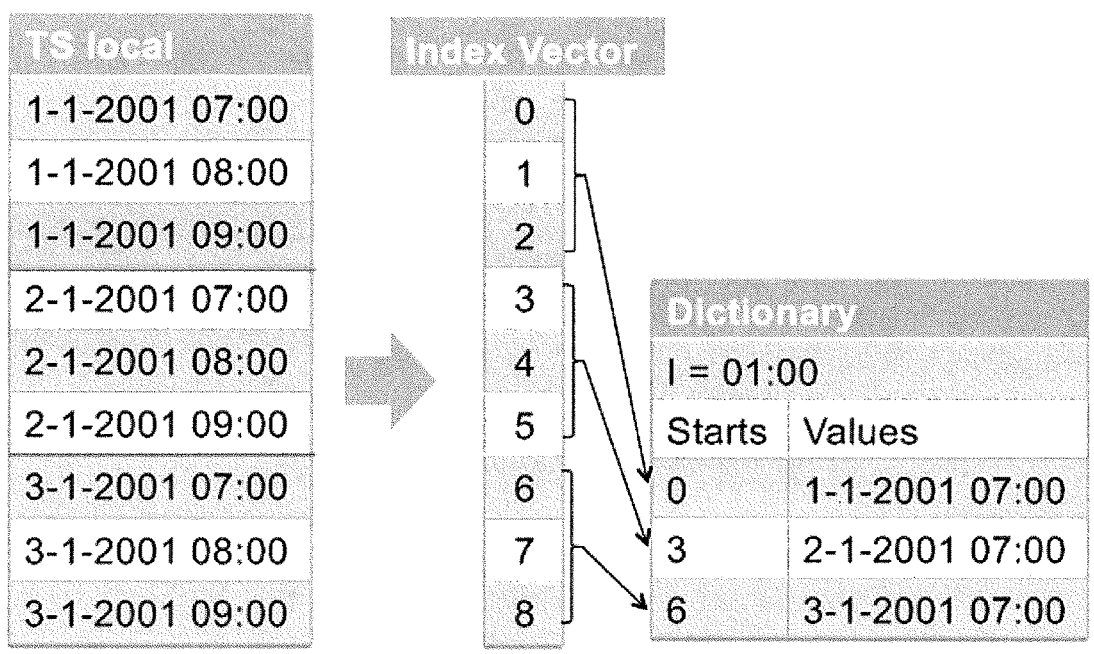
FIG. 4 shows the enhanced time stamp dictionary with constant memory consumption with support for gaps.

In accordance with implementations consistent with the compression techniques described herein, the time stamps are divided into multiple blocks, where each block contains only a gapless sequence of time stamps. For this purpose, the time stamps are divided directly at the borders of the gaps existing in a time series. The support for multiple blocks comes with the requirement of storing the starting points as well as the first value of each block. In principal, this approach can be seen as having multiple sub-dictionaries each storing the time stamps of separate strictly equidistant time series. This is illustrated in FIG. 4.

The starts-vector connects the index values of the index-vector to the respective blocks. The values vector describes the respective starting time stamp for each of the blocks. Thus, given a specific index vector value, the starts vector is first scanned until the respective block in which the value is contained is found. With that, the position of the starting value of the respective block in the starting values vector is retrieved. With those two units of information, the time stamps are calculated as described for the general time series dictionary.

Adding gap support increases the memory consumption of the dictionary compared to the constant memory consumptions of the standard time series dictionary, since the two additional vectors "starts" and "starting values" consume additional memory. Thus, the memory consumption of the dictionary in the latter case depends on the number of blocks, and therefore, indirectly on the number of gaps that are present in the data. In addition, operations on the dictionary are now required to access two additional vectors. Scanning the starts vector, for example, requires a binary search with a complexity of log(n), where n is the number of values considered, instead of a constant complexity when accessing values in the former approach.

While an equidistant time series is preferably used, the techniques described above can apply to a dictionary that supports regular gaps, such as no data records on holidays, data only being available during working days (i.e., excluding weekends), and/or data only being recorded during defined hours per day (i.e., business hours). Additional layers can be added on top of the above-described implementations to allow for a faster access to requested time-stamps.

Figure 5:
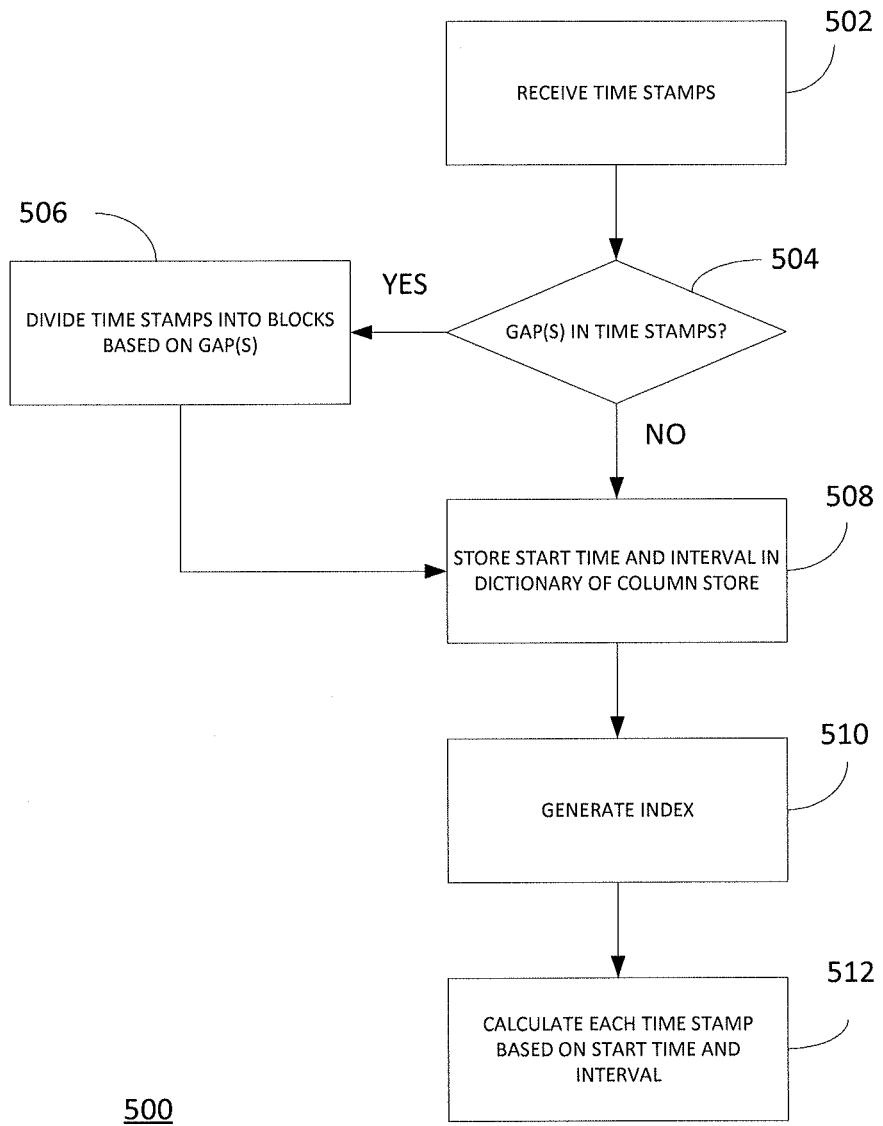
FIG. 5 is a process flow diagram illustrating aspects of a method having one or more features consistent with implementations of the current subject matter.

FIG. 5 is a flowchart of a method 800 for compressing time stamp columns. At 502, series data is received by a data platform from one or more external data sources. The series data can include a number of time stamps within a time range for operations executed on a database of a data platform. The time stamps include a start time, each successive pair of time stamps is separated by an equal increment of time that defines an interval, and each interval defines a position in the time series for each time stamp of the series data. At 504, one or more processors of the data platform determine whether there are gaps in the series data, i.e. such as gaps in the time stamps. If there are gaps, at 506 the one or more processors divide the time stamps into blocks of series data, based on the gaps, such that each block has a start time and an interval.

At 508, the one or more processors store the start time and interval in a dictionary of a column store of a database of the data platform. At 510, the one or more processors generate an index in the column store, where the index has a number of index vectors as described above. At 512, the one or more processors use the index vectors, as described above, to calculate each time stamp of the series data or for each block, from the start time and the position in the time series based on the interval, both of which are stored in the dictionary in the column store. Accordingly, the amount of data needed to store the series data as time stamps is compressed to storing only index vectors and start time and intervals, stored in a dictionary.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

Other implementations may be within the scope of the following claims.

What is claimed is:

1. A computer-implemented method comprising:
    receiving a plurality of time stamps of a time series of data for operations executed on a database;
    determining that the plurality of time stamps includes a gap separating a first subseries of successive time stamps separated by an equal time interval and a second subseries of successive time stamps separated by the equal time interval, the first subseries including a first start time of the first subseries, the second subseries including a second start time of the second subseries, and the gap separating the first subseries and the second subseries being different than the equal time interval;
    storing, in a dictionary of a column store of the database, the first start time of the first subseries, the second start time of the second subseries, and the equal time interval, a starting values vector storing a respective starting time stamp for each of the first subseries and the second subseries;
    generating an index vector comprising a first start value and a second start value, the first start value corresponding to the first start time of the first subseries and the second start value corresponding to the second start time of the second subseries; and
    executing, based at least in part on the dictionary including the equal time interval and the index vector the operations on the time series of data.

2. The computer implemented method in accordance with claim 1, further comprising:
    dividing the time series into a first time series block corresponding to the first subseries and a second time series block corresponding to the second subseries.

3. The computer implemented method in accordance with claim 1, wherein the executing of the operations comprises calculating one or more time stamps of the plurality of time stamps included in the first subseries and/or the second subseries based at least on the dictionary and the index vector.

4. The computer implemented method in accordance with claim 1, wherein the database includes an in-memory database having a hybrid store structure, the hybrid store structure comprising the column store and a row store.

5. A computer program product comprising a non-transitory machine-readable medium storing instructions that, when executed by at least one programmable processor, cause the at least one programmable processor to perform operations comprising:
receiving a plurality of time stamps of a time series of data for operations executed on a database of a data platform;
determining that the plurality of time stamps includes a gap separating a first subseries of successive time stamps separated by an equal time interval and a second subseries of successive time stamps separated by the equal time interval, the first subseries including a first start time of the first subseries, the second subseries including a second start time of the second subseries, and the gap separating the first subseries and the second subseries being different than the equal time interval;
storing, in a dictionary of a column store of the database, the first start time of the first subseries, the second start time of the second subseries, and the equal time interval, a starting values vector storing a respective starting time stamp for each of the first subseries and the second subseries;
generating an index vector comprising a first start value and a second start value, the first start value corresponding to the first start time of the first subseries and the second start value corresponding to the second start time of the second subseries; and
executing, based at least in part on the dictionary including the equal time interval and the index vector, the operations on the time series of data.

6. The computer program product in accordance with claim 5, wherein the operations further comprise an operation to divide the time series into a first time series block corresponding to the first subseries and a second time series block corresponding to the second subseries.

7. The computer program product in accordance with claim 5, wherein the executing of the operations comprises calculating one or more the time stamps of the plurality of time stamps included in the first subseries and/or the second subseries based at least on the dictionary and the index vector.

8. The computer program product in accordance with claim 5, wherein the database includes an in-memory database having a hybrid store structure, the hybrid store structure comprising the column store and a row store.

9. A system comprising:
at least one programmable processor; and
at least one memory storing instructions that, when executed by the at least one programmable processor, cause the at least one programmable processor to perform operations comprising:
receiving a plurality of time stamps of a time series of data for operations executed on a database of a data platform;
determining that the plurality of time stamps includes a gap separating a first subseries of successive time stamps separated by an equal time interval and a second subseries of successive time stamps separated by the equal time interval, the first subseries including a first start time of the first subseries, the second subseries including a second start time of the second subseries, and the gap separating the first subseries and the second subseries being different than the equal time interval;
storing, in a dictionary of a column store of the database, the first start time of the first subseries, the second start time of the second subseries, and the equal time interval, a starting values vector storing a respective starting time stamp for each of the first subseries and the second subseries;
generating an index vector comprising a first start value and a second start value, the first start value corresponding to the first start time of the first subseries and the second start value corresponding to the second start time of the second subseries; and
executing, based at least in part on the dictionary including the equal time interval and the index vector, the operations on the time series of data.

10. The system in accordance with claim 9, wherein the operations further comprise an operation to divide the time series into a first time series block corresponding to the first subseries and a second time series block corresponding to the second subseries.

11. The system in accordance with claim 9, wherein the executing of the operations comprises calculating one or more time stamps of the plurality of time stamps included in the first subseries and/or the second subseries based at least on the dictionary including the equal time interval, the first index, and the second index.

12. The system in accordance with claim 9, wherein the database includes an in-memory database having a hybrid store structure, the hybrid store structure comprising the column store and a row store.

* * * * *